United States Patent [19]

Takahashi et al.

[11] 4,005,530
[45] Feb. 1, 1977

[54] AUDIO-VISUAL TRAINING DEVICE WITH SELECTIVE BRANCHING

[75] Inventors: Bunzo Takahashi, Akishima; Hiroshi Tachibana; Minoru Otake, both of Tokyo, all of Japan

[73] Assignee: Fuji Photo Film Co., Ltd., Minami-ashigara, Japan

[22] Filed: Feb. 18, 1975

[21] Appl. No.: 550,487

Related U.S. Application Data

[63] Continuation-in-part of Ser. No. 433,414, Jan. 8, 1974, abandoned.

[30] Foreign Application Priority Data

Jan. 8, 1973  Japan .............................. 48-4739

[52] U.S. Cl. ..................... 35/8 A; 35/9 A
[51] Int. Cl.$^2$ ................................. G09B 7/04
[58] Field of Search ............ 35/5, 6, 8 R, 8 A, 9 R, 35/9 A, 9 B

[56] References Cited

UNITED STATES PATENTS

| | | | |
|---|---|---|---|
| 3,141,243 | 7/1964 | Chapman et al. | 35/9 A |
| 3,355,818 | 12/1967 | Whitehorn | 35/9 A |
| 3,584,396 | 6/1971 | Hannah et al. | 35/9 A |
| 3,590,497 | 7/1971 | Darby | 35/9 A |
| 3,597,855 | 8/1971 | Stejskal et al. | 35/9 A |
| 3,629,956 | 12/1971 | Thomas et al. | 35/9 A |
| 3,693,268 | 9/1972 | Thompson | 35/48 R |
| 3,798,793 | 3/1974 | Kachi | 35/9 A |

Primary Examiner—Anton O. Oechsle
Assistant Examiner—Vance Y. Hum
Attorney, Agent, or Firm—Sughrue, Rothwell, Mion, Zinn & Macpeak

[57] ABSTRACT

A training device including a slide projector and a magnetic audio reproducing device is disclosed. The projector is provided with a code reader for reading a code on a film for each image frame. The code indicates the address number of the frame and the information contained in the frame. The training device includes an operating circuit connected with the code reader for addressing the various image frames. A group of switches operated by a student is connected in the operating circuit to provide an answer signal and a frame address number-signal to the operating circuit. A controller circuit is connected with the operating circuit and responsive to a signal from the operating circuit to operate a film drive circuit. The operating circuit controls the film drive circuit through the controller circuitry for selecting and bringing an appropriate subsequent frame of the film to the projection station depending on which of the group of switches is operated by the student.

1 Claim, 13 Drawing Figures

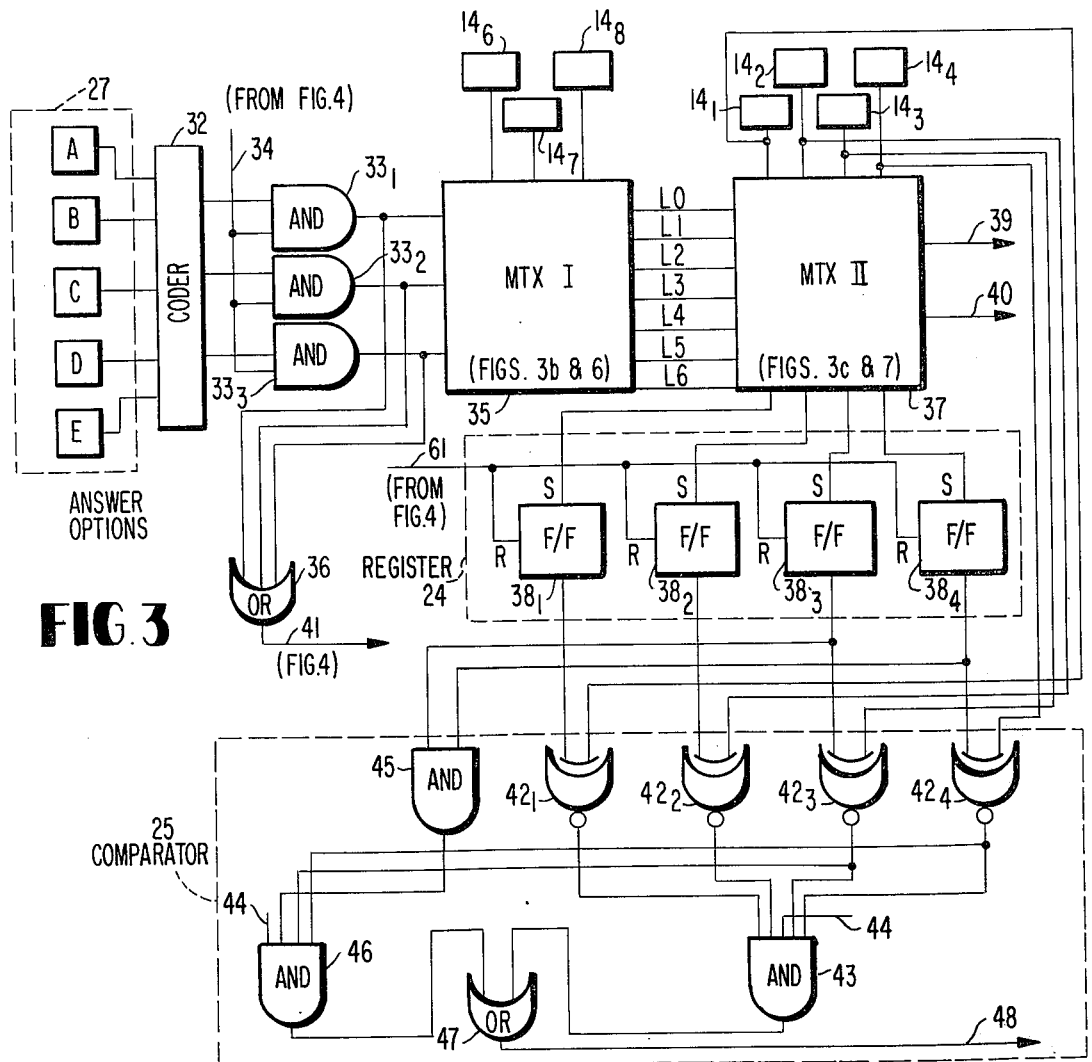

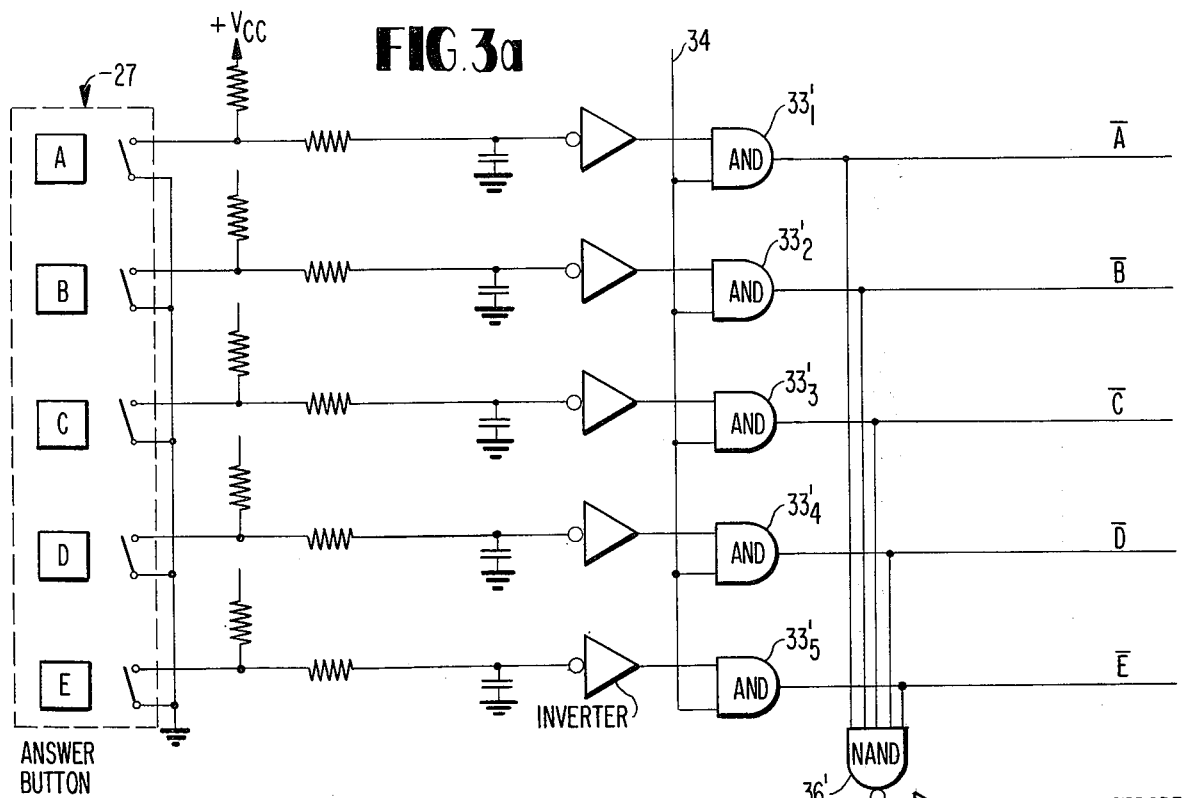

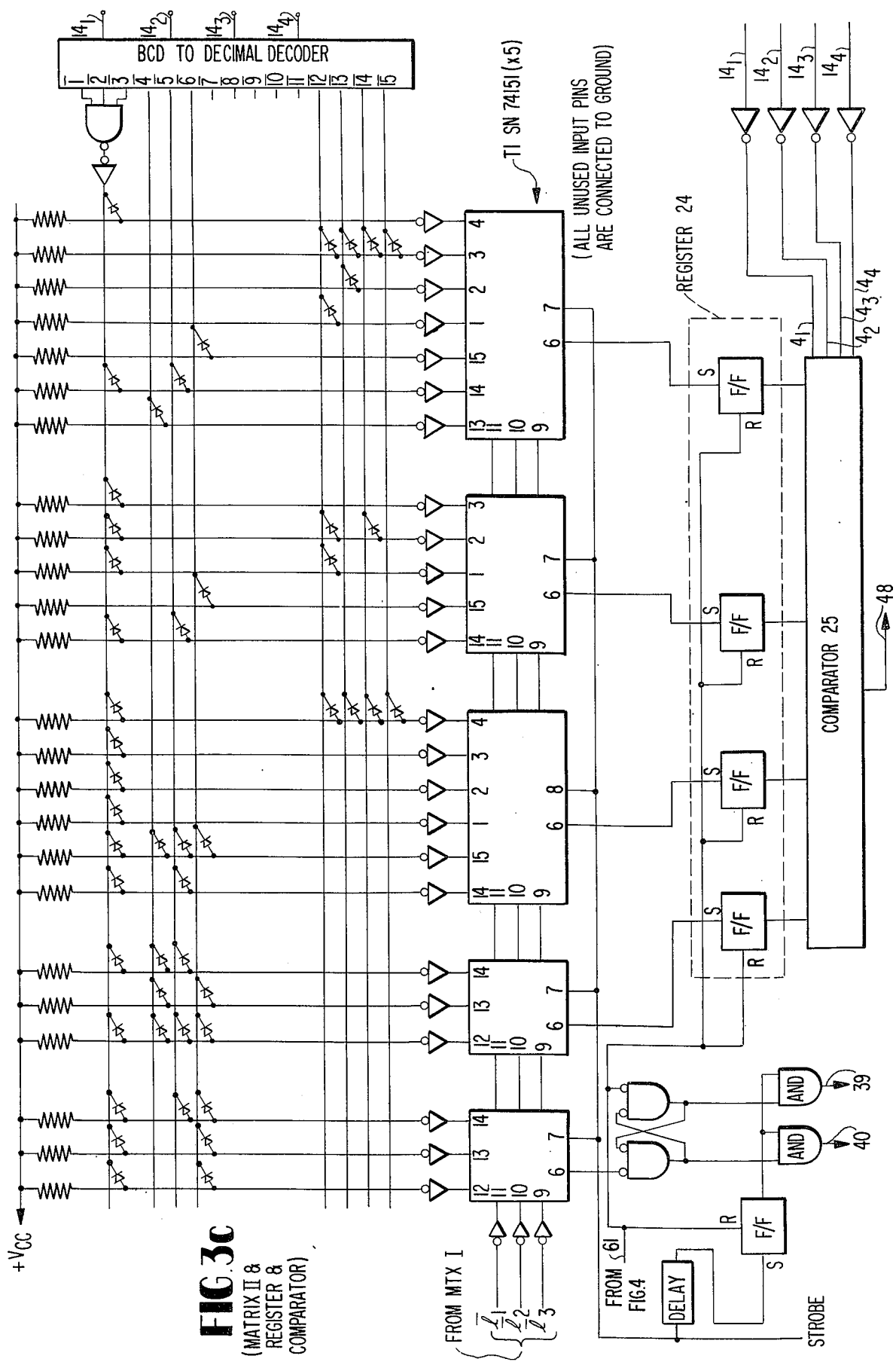

FIG. 6

MTX I "ANSWER LEVEL CALCULATING TABLE"

| ANSWER BUTTON \ ANSWER BIT($2_6 2_7 2_8$) | 100 | 010 | 110 | 001 | 101 | 011 | 111 |
|---|---|---|---|---|---|---|---|
| A | L0 | L1 | L1 | L1 | ✕ | ✕ | ✕ |
| B | L1 | L0 | L2 | L2 | ✕ | ✕ | ✕ |
| C | L2 | L2 | 0 | L3 | ✕ | ✕ | ✕ |
| D | L3 | L3 | L3 | 0 | ✕ | ✕ | ✕ |
| E | ✕ | ✕ | ✕ | ✕ | L4 | L5 | L6 |

FIG. 7

MTX II "BRANCH PATTERN TABLE"

| LEVEL \ PROGRAM BIT($2_1-2_4$) | 1000 | 0100 | 1100 | 0010 | 1010 | 0110 | 0011 | 1011 | 0111 | 1111 |
|---|---|---|---|---|---|---|---|---|---|---|
| L0 | +R5 | +R5 | +R5 | | | | +R4 | +R4 | +R4 | +R4 |
| L1 | +R6 | +R6 | +R6 | ✕ | | | +R1 | +R1 | +R1 | +R1 |
| L2 | +R6 | +R6 | +R6 | | ✕ | | +R2 | +R1 | +R2 | ✕ |
| L3 | +R6 | +R6 | +R6 | | | ✕ | +R3 | ✕ | ✕ | ✕ |
| L4 | -R12 | -R12 | -R12 | +R12 | -R12 | -R7 | | | | |
| L5 | -R7 | -R7 | -R7 | +R8 | +R7 | -R8 | | ✕ | | |
| L6 | -R8 | -R8 | -R8 | +R9 | +R8 | -R9 | | | ✕ | |

X+R5 MEANS TO GO FORWARD TO THE FRAME WHICH HAS ADDRESS BIT, i.e. $2_1-2_4$ OF (1010).

-R7 MEANS TO GO BACKWARD TO THE FRAME WHICH HAS ADDRESS BIT, i.e. $2_1-2_4$ OF (1110).

AUDIO-VISUAL TRAINING DEVICE WITH SELECTIVE BRANCHING

CROSS-REFERENCE TO RELATED APPLICATION

This application is a continuation-in-part application of our prior, copending application Ser. No. 433,414, filed Jan. 8, 1974, now abandoned.

BACKGROUND OF THE INVENTION

1. Field of the Invention

This invention relates to a training device, and more particularly, to an educational training device used with a slide projector.

2. Description of the Prior Art

Educational training devices using a slide projector is well-known in the art. In such a training device, questions and answers with explanations are projected. In the conventional training device, however, it has been difficult or impossible to selectively project a different explanation for the answer according to an answer given by the student. In some cases, it is desirable to selectively project different explanations according to the actual answer made by a student. By properly projecting a different explanation of the answer according to the content of the wrong answer made by a student, more effective training can be obtained.

One attempt to improve the effectiveness of training devices is described in U.S. Pat. No. 3,584,396 to Hannah et al. This device employs a slide projector and a tape recorder and can be programmed to branch to different frames depending on the student's response. The direction and the number of frames to be branched are recorded on the visual record itself as signals, and these signals are read out by a detection means, the number of frames to be branched is memorized in a counter, the visual record and audio record are driven independently, and the tape recorder and teaching machine are driven until the number of frames of the visual record and the number of narrations of the audio record become equal to the number memorized in the counter. Since all the data are recorded on the visual record as signals, the number of signals which should be recorded on the visual record is greatly increased in the case of multiple branching. In the Hannah et al device, the counter is used for branching.

Another example known in the prior art is disclosed in U.S. Pat. No. 3,715,811 to Thompson et al. In the device described by Thompson et al., multiple tracks are provided each for visual information, audio information and control information, and branching is limited to changing each track and changing reproduction direction. Since branching is to change each track and reproduction direction, the freedom in producing the software can be considered low.

Yet another prior art training device is described in U.S. Pat. No. 3,664,027 to Budnik et al. The branching method described in this patent differs basically from those described by Hannah et al. and Thompson et al., supra. In the Budnik et al. device, even if a learner answers the question, the visual record is not branched at all to other frames, but only the audio record responds to the answer of the learner, and its tracks and reproduction direction are changed for presentation to the learner. Therefore, the visual record does not correspond to the audio record on a one-to-one relation.

In view of the above described requirements inherent in conventional training devices, it is a primary object of the present invention to provide a training device provided with a slide projector in which different frames of a slide film can be selectively brought to the optical axis of the projector according to the content of the answer received from the student.

SUMMARY OF THE INVENTION

This invention provides a training device including a slide projector which comprises a code reading means which is provided in the projector for reading the code on the film for each image frame in the film with this code indicating the address number of the frame and the kind of information contained in the frame, an operating means connected with the means for reading the code, a group of switches connected with the operating means to provide an answer signal to the operating means, a controller connected with the operating means and a film driving means connected with the controller and operating means by the controller. The operating means controls the film driving means using the controller for selecting and bringing an appropriate frame of the film into the projection station depending upon the answer signal.

The invention is distinguished from the device disclosed in the Hannah et al. patent, for example, in that the frame address of the visual record to be branched and the branching direction are calculated by putting the binary signal groups of the visual record and the pressed answer button into a matrix memory. This avoids using a counter for branching thereby minimizing the number of signals required for branching operations. For purposes of synchronization, the audio record is driven preferentially with the visual record following the running of the audio record according to a signal recorded on a second track of the audio record. Whether the frame is to be branched is determined each time the audio record is advanced by one frame by detecting the binary signal group of the visual record and comparing with the address calculated from the matrix. Thus, according to the present invention, a simple training device using normal roll films, slide projector, magnetic tape and tape recorder and having unusual freedom in software programming can be provided.

Other objects, features and advantages of the present invention will be made apparent from the following description of the preferred embodiments thereof taken in conjunction with the accompanying drawings.

BRIEF DESCRIPTION OF THE ACCOMPANYING DRAWINGS

FIG. 3 is a block and logic diagram of the operator and associated circuitry shown in FIG. 2.

FIGS. 3a, 3b and 3c are detailed block and logic diagrams of a specific illustrative embodiment of the operator and associated circuitry.

FIG. 4 is a logic circuit of the controller shown in FIG. 2.

FIGS. 6 and 7 are matrix tables defining specific example of matrices MTX I and MTX II used in the operator shown in FIG. 3.

DETAILED DESCRIPTION OF THE INVENTION

Figure 1:
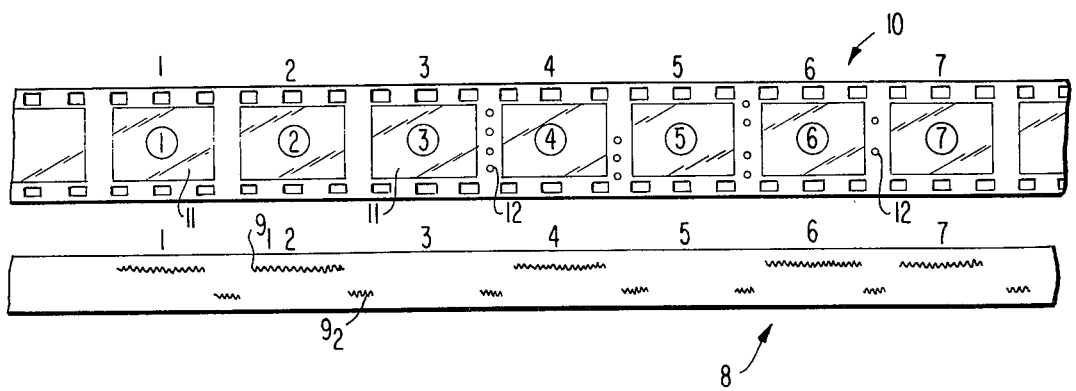
FIG. 1 is a fragmentary view of a film employed in the slide projector, and a magnetic tape employed in the tape recorder provided in the training device in accordance with the present invention.

Referring to FIG. 1 showing the film 10 employed in the present invention, frame 11 carrying images to be projected on a screen are arranged in series on a roll film, for example, a 36 mm width film. In the specific example illustrated, a partial sequence of seven frames, numbered 1 to 7, is illustrated. Between adjacent frames, an optically distinguishable code, for example, a binary code comprising 8-bit indications, e.g., perforations 12, difference in optical transparency, reflectivety, etc., is provided. Hereinafter, the explanation and description will be with reference to a binary code and to perforations as code indications, but it will be obvious that other equivalent approaches can be used. the 8-bit code 12 comprises eight On-Off signals $12_1$ to $12_8$ provided at eight predetermined positions. The signals $12_1$ to $12_8$ represent ON or OFF due to the existence or non-existence of a perforation at the predetermined position of the film 10.

Just below the film 10 in FIG. 1 is an illustration of a magnetic tape 8 employed in the present invention. The magnetic tape 8 is provided with two tracks $9_1$, $9_2$, the first of which is for narrations of film frames 11 and the other of which is for signals for film feeding. The portions of the magnetic tape 8 corresponding to specific frames 11 in the film 10 are also numbered 1 to 7. It will be noted that narrations $9_1$ are not provided for every frame, as will become clear hereinafter, but signals $9_2$ for film feeding preceed every frame 11.

When the device according to the invention is started, the first film frame 11 is projected and the corresponding narration on track $9_1$ comes out from a speaker. When the narration of the first film frame is completed, the film feed signal recorded on the second track $9_2$ in the vicinity thereof operates the driving device of the projector, and one frame of the film is fed forwardly. In this manner, the film is projected and advanced in sequence by the same mechanism as that of an ordinary auto slide projector with sound and maintaining synchronization with voice until a question frame is projected and the tape driving is stopped.

Figure 2:
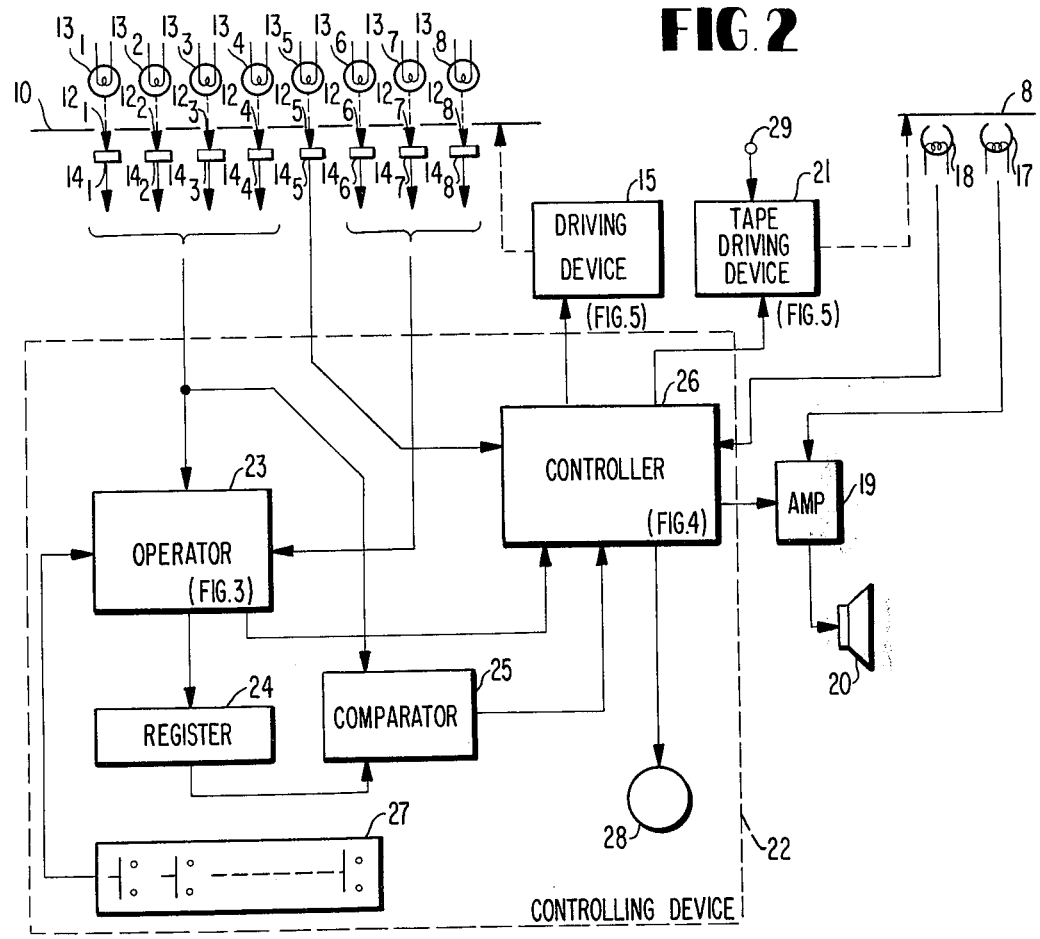
FIG. 2 is a diagrammatic view showing an electric circuit employed in the training device in accordance with the present invention.

Referring to FIG. 2, the slide projector which projects the film 10 as shown in FIG. 1 is provided with a signal read-out means comprising light sources $13_1$ to $13_8$ and photoelectric elements $14_1$ to $14_8$ to receive light from the light sources $13_1$ to $13_8$. The lights sources $13_1$ to $13_8$ and photoelectric elements $14_1$ to $14_8$ are provided on the opposite sides of the film 10 so that the light passing through the perforations of the code signal $12_1$ to $12_8$ can be received by the photoelectric elements, $14_1$ to $14_8$. Among the 8-bit signals $12_1$ to $12_8$, the four bits $12_1$ to $12_4$ are used to choose the branch pattern to calculate the film address number to be branched, forwardly or backwardly, according to the student's specific answer or response to the said film frame, and/or to represent the film address number of itself. The fifth bit $12_5$ represents the kind of image in the frame, that is, it shows that the image is an explanation or a question. (The question is not necessary to be actually in the form of question, but means to start branching in the said film frame forwardly or backwardly). The remainder of the bits from the sixth to the last, $12_6$ to $12_8$ provide the answers in the question frame with whether right of wrong and is used to calculate an answer level according to a student's specific selection of answer. The film 10 is fed by a driving device 15 which feeds the film 10. The magnetic recording tape 8, which alternatively could be a disc, drum, sheet, etc., cooperates with reproducing heads 17 and 18. The sound reproducing head 17 is aligned with track $9_1$, and the film feed signal detecting head 18 is aligned with track $9_2$ of tape 8. The sound reproducing head 17 is connected with an amplifier 19 which in turn is connected with a speaker 20 to reproduce the sound in the speaker. The magnetic tape 8 is fed by a tape driving device 21. The four photoelectric elements $14_1$ to $14_4$ are connected with an operator 23 of a controlling device 22. The controlling device 22 includes, in addition to the operator 23, a register 24 which is connected with the operator 23 and a comparator 25 which is connected with the register 24 and the photoelectric elements $14_1$ to $14_4$. The controlling device 22 further includes a controller 26 connected with the fifth photoelectric element $12_5$ representing the kind of image, the operator 23, the comparator 25, the driving devices 15 and 21 and an indicating lamp 28. A group of switches 27 are connected with the operator 23. The indicating lamp 28 and the group of switches 27 are also included in the controlling device 22. The reference number 29 indicates a terminal to place a start signal into the driving device 21.

The operator 23 is shown in FIG. 3 and includes a coder 32 connected to the answer buttons 27, here labeled A, B, C, D and E to correspond with the possible answers presented in a question frame. The coder 32 is of a type well-known in the art, such as a diode matrix, and generates a 3-bit binary code identifying the answer button pressed by the student. This 3-bit binary code is sampled by AND gates $33_1$, $33_2$ and $33_3$ gated by an enabling signal on line 34 from the controller 26 and read into a first computing matrix 35, here labeled MTX I. At the same time, the 3-bit code is also coupled by way of three input OR gate 36 to set a flip-flop in controller 26 as will be described hereinafter. For this reason, the code 0 0 0 as an output from coder 32 is not permitted, but this leaves seven possible codes to be assigned to the five answer buttons 27.

Matrix 35 also receives as inputs the outputs of photo detectors $14_6$, $14_7$ and $14_8$ and provides outputs L0 to L6 to a second computing matrix 37, here labeled MTX II. Matrix 37 also receives as inputs the outputs of photo detectors $14_1$ to $14_4$ and provides outputs to register 24 and to controller 26. The register 24 is composed of four flip-flops, $38_1$ to $38_4$, and is used to store the frame address from matrix 37 to be subsequently projected. The outputs on lines 39 and 40 to controller 26 indicate the direction, forward or backward, respectively, that the film 10 and tape 8 are to be driven.

Comparator 25 receives inputs from both photo detectors $14_1$ to $14_4$ and flip-flops $38_1$ to $38_4$. These inputs are connected to EXCLUSIVE OR gates $41_1$ to $42_4$, respectively. The inverted outputs of EXCLUSIVE OR gates $42_1$ to $42_4$ are connected as inputs to AND gate 43 which also receives as an input a film advance pulse on line 44 from controller 26. Comparator 25 also includes an AND gate 45 receiving inputs from flip-flops $38_3$ and $38_4$ and another AND gate 45 receiving inputs from AND gate 45, EXCLUSIVE OR gates $42_3$ and $42_4$, and the film advance pulse on line 44. The outputs of AND gates 43 and 46 are connected to the inputs of OR gate 47 which provides an output on line 48 to controller 26.

A specific illustrative embodiment of the operator is shown in more detail in FIGS. 3a, 3b, and 3c. Referring first to FIG. 3a, the decoder 32 has been omitted and, instead, the outputs developed by the closure of answer buttons 27 are inverted before being applied to one input of a correspoinding AND gate $33_1{}'$, to $33_5{}'$. An enabling signal on line 34 gates AND gates $33_1{}'$ to $33_5{}'$ to provide output signals $\overline{A}, \overline{B}, \overline{C}, \overline{D},$ and $\overline{E}$ to matrix MTX I and also to AND gate $36'$ which provides an output on line 41 and develops the STROBE pulse required by matrices MTX I and MTX II, as explained in more detail hereinafter.

As shown in FIGS. 3b and 3c, matrices MTX I and MTX II consist of conventional diode matrices and commercially available 8-bit multiplex selectors. In this case, the multiplex selectors and Texas Instruments (TI) type SN74151 or SN74151A, the latter being described on pages 294 and 295 of *The TTL Data Book for Design Engineers*, published by Texas Instruments, Inc., in 1973. These multiplexers will operate only when a negative strobe pulse is applied to pin number 7. All pins of the TI SN74151 or SN 7451A multiplexers which are not used are connected to ground. Matrix MTX I shown in FIG. 3b will provide an answer level $L_1, L_2, L_3, L_4, L_5, L_6$ or $L_7$ consisting of 3 binary bits ($l_1$, $l_2$ and $l_3$) according to the answer bits ($12_6, 12_7$ and $12_8$) in the projected film frame and the selectively pushed answer button A to E, operated by the student. The matrix MTX II shown in FIG. 3c will provide the address number of the film frame to be branched and the direction of branching depending on the answer level consisting of 3 binary bits ($\overline{l}_1, \overline{l}_2$ and $\overline{l}_3$) from matrix MTX I and the film bits $12_1$ to $12_4$ in the projected film frame.

The controller 26 is shown in FIG. 4 and contains various circuitry to generate control signals. First, the feed signal detecting head 18 reproduces signals on track $9_2$ which are amplified by amplifier 49 as film advance pulses. The film advance pulses are supplied directly to the slide projector driving device 15 over line 50 and also via a delay device 51 to operator 23 on line 44. The output on line 39 from matrix 37 indicating the forward direction is connected to one input of OR gate 52. The output of OR gate 52 sets flip-flop 53 which provides a control signal over line 54 to tape driving device 21 to control the speed of tape 8 and the connection to speaker 20 from amplifier 19. The output on line 40 from matrix 37 indicating the backward direction is connected to the other input of OR gate 52 and directly to flip-flop 55. An output on line 40 sets flip-flop 55 which provides a control signal over line 56 to film driving device 15 and tape driving device 21 to control the direction of motion of both film 10 and tape 8. The output on line 40 also sets flip-flop 57 which inhibits AND gate 58 and enables AND gate 59. An output from comparator 25 sets flip-flop 60 which also enables AND gate 59 which then passes the film advance pulse on line 44 from delay device 51. On the other hand, if flip-flop 57 remains in its reset state, i.e., there is no output on line 40, AND gate 58 is enabled to pass the output of comparator 25. The outputs of AND gates 58 and 59 are connected through OR gate 62 to reset line 61. A pulse on line 61 resets flip-flops 53, 55, 57 and 60 of FIG. 4 and flip-flops $38_1$ to $38_4$ of register 24 in FIG. 3.

Photo detector $14_5$, which detects the film image kind information, provides one input to AND gate 63. An output from flip-flop 53, however, set by either a forward or backward pulse on lines 39 or 40, respectively, will inhibit AND gate 63. If AND gate 63 is enabled by an output from photo detector $14_5$ and flip-flop 53 remaining in its reset state, AND gate 63 will pass a film advance pulse on line 44 from delay device 51 to set flip-flop 64. The output of flip-flop 64 goes to tape driving device 21 to control the tape recorder motor. The output of flip-flop 64 also controls lamp 28 and is used to sample AND gates $33_1, 33_2$ and $33_3$ in FIG. 3. The outputs of those AND gates will produce a reset pulse on line 41 from OR gate 36 which is used to reset flip-flop 64.

Figure 5:
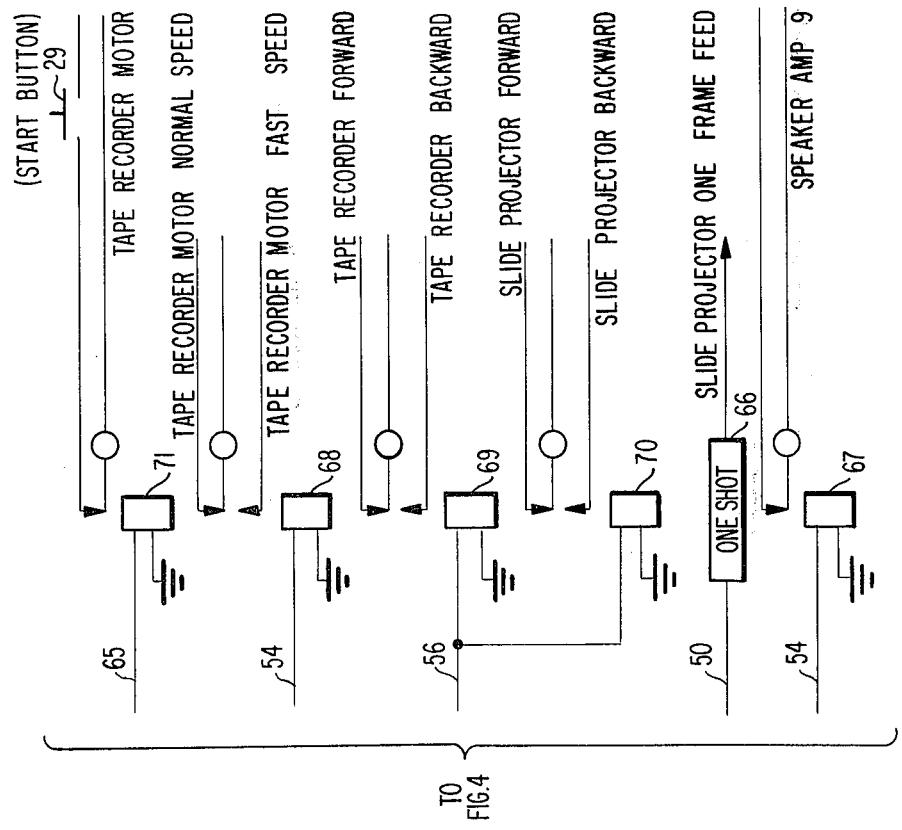
FIG. 5 is a schematic diagram of the circuit of the film and tape driving devices controlled by the controller and other devices shown in FIG. 2.

Referring now to FIG. 5 which shows the control circuits of the film and tape driving devices 15 and 21, a film advance pulse reproduced by detecting head 18 and amplified by amplifier 49, triggers a one-shot 66, the output of which is connected to the slide projector frame feed. Either a forward or backward pulse on lines 39 and 40 from computing matrix 37 will result in a control signal on line 54. On the one hand, this control signal will energize relay 67 to disconnect speaker 20 from amplifier 19, and on the other hand, to switch the tape recorder motor to fast speed by energizing relay 68. The direction of both the tape recorder and the film projector is controlled by an output on line 56 which energizes relays 69 and 70. Finally, an output on line 65 energizes relay 71 to control the tape recorder motor.

In operation of the above-described training device including a slide projector to project images recorded on the film 10 and reproduce the sound recorded on the magnetic tape 8, the magnetic tape 8 is started to travel upon the input of the starting signal given at the terminal 29 of the tape driving device 21, so that the explanation is reproduced by the speaker 20. Since the film feed signal is detected by the detecting head 18 every time the explanation for one frame 11 of the film 10 ends, the signal is transmitted to the driving device 15 through the controller 26 and the film 10 is started to travel. Therefore, every time the film 10 is fed, the explanation of the image of the frame 11 is reproduced by the speaker 20 and the film 10 is fed at a predetermined speed automatically. When the film 10 is fed as described above and the film image kind indicating signal $12_5$ is detected by the photoelectric element $14_5$, the controller 26 operates to stop the film 10 and the tape 8 through the driving devices 15 and 21 and at the same time the indicating lamp 28 is turned on thereby. Then, when the student operates one of the switches in the group of switches 27 to answer the question projected on the screen by selecting an answer from several possible answers, the signal representing the answer selected is transmitted to the operator 23. At the same time, the operator 23 is provided with the signal from the photoelectric elements $14_1$ to $14_4$ representing the selection of the program to be used and from the photoelectric elements $14_6$ to $14_8$ representing the correct answer. Therefore, the operator 23 determines the type of answer selected, such as correct or not. Further, the operator 23 chooses the frame to be subsequently projected according to the program selected, and the type of answer chosen. The signal from the operator 23 which indicates the frame to be subsequently projected is recorded in the register 24. Simultaneously, tape fast forward or backward signal, 39 or 40 is put into the controller 26. In response to this signal, the film driving device 15 and the tape driving device 21 feed the film 10 and the tape 8 quickly, and accordingly, the comparator 25 is provided successively with the film frame address numbers given from the photoelectric elements $14_1$ to $14_4$. When the signal becomes coincident with the signal recorded in the register 24, an output signal is generated by the comparator 25, which is put into the controller 26. Therefore, the film 10 and the tape 8 are stopped by the driving devices 15 and 21. Then, when the film 10 and the tape 8 start to travel at a predetermined speed forward, the indicating lamp 28 is turned off. Further, while the film 10 and the tape 8 are quickly fed, a signal is transmitted from the controller 26 to the amplifier 19 to stop the reproduction of the sound signal recorded on the tape 8. In case of the reverse quick feed of the film and tape, the magnetic tape 8 is fed back further by one frame so that the tape may be fed back up to the point where the explanation of the selected frame of the film 10 starts. When the last question of the film is projected and the correct answer therefor is selected, a signal which indicates the first frame address number is generated from the operator 23 to bring the training device to the original initial stage.

In order to illustrate the operation of the invention in more detail, consider first the case where the narration does not exist on the question frame; this will be described in conjunction with one embodiment.

Figure 8:
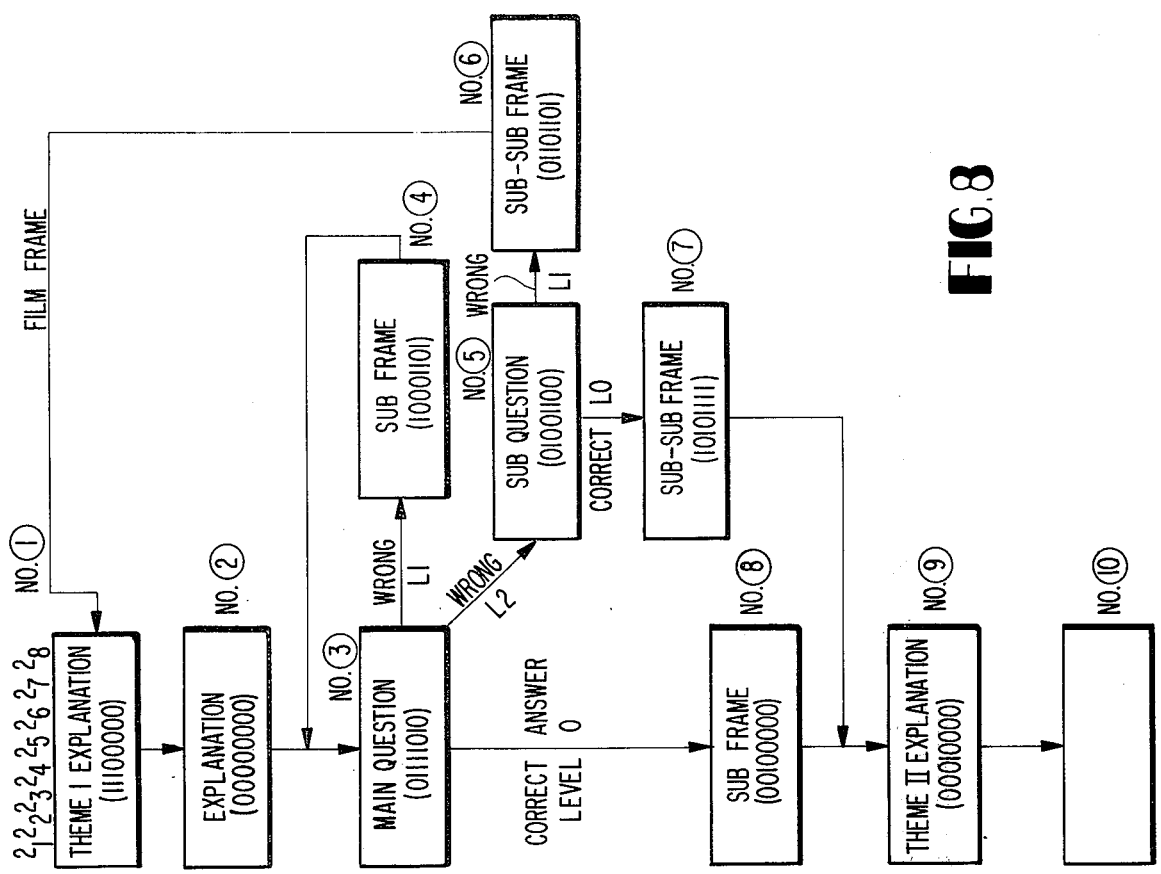
FIG. 8 is a flow diagram of an actual example of a software program illustrating the operation of the present invention.

In this case, for instance, the construction of the film 10 and magnetic tape 8 is as follows for the sequence of seven frames shown in FIG. 1:

1. Explanation frame
2. Explanation frame
3. Question frame
4. Explanation frame for wrong answer
5. Supplemental lesson
6. Explanation frame for correct answer
7. Explanation frame In this case, question are given visually and there is not narration of the question frame. (The question frame is not necessary to be actually in the form of question, but means a frame to start branching. For instance, frames Nos. (4), (6) and (7) of FIG. 8 are not of question, but are formally called Question Frames though after the student's completion of supplemental study course, advance is not made sequentially to the next frame, but branching is made to a frame in either the backward or forward direction.)

When the start button 29 is depressed, the first explanation frame 11 is projected and the corresponding first narration on track $9_1$ is presented to a student. When a narration is completed, film feed signals recorded on track $9_2$ are detected by the detecting head 18, and the driving device 15 of the slide projector is driven to feed one film frame. Then, the second explanation frame is projected and the second narration is given to the student. The narration is completed and one film frame is fed by the film feed signal. Then, the third film question frame is present to the student.

As previously described, and 8-bit binary signal is provided in the vicinity of each frame. The four bits of $12_1$ to $12_4$ are used to select the branch pattern memorized in the operator 23, and/or represent the address of the frame in question, when a student replies through the answer button 27. The bit of $12_5$ is used to represent the categories of frames. In the case of the present example, this bit is used to represent whether the frame in question is an explanation frame or a question frame, but as will be explained in more detail, it is also used to represent whether the frame in question has to be branched or addressed. The bits of $12_6$ to $12_8$ are used to represent whether the reply is correct or not when a student makes a selection of one answer among several given to a question, or these bits are used to level the answer as will become clear hereinafter.

When the question frame is represented to the student, the bit of $12_5$ is detected by the code detector $14_5$ and running of tape 8 is stopped by operating the tape driving device 21 through the controller 26 thereby turning on the lamp 28 for urging the student to reply. In this status, the third question frame of film 10 is being projected and several answers are provided. The sound tape 8 is at a standstill, and stands by until the student presses an answer button 27. In this case, the tape is stopped at the third segment of track $9_1$ which has no narration.

When the student presses one of the answer buttons 27, the signal is fed into operator 23 for coding by coder 32 and then fed into the computing matrix 35. At the same time, bits $12_6$, $12_7$ and $12_8$ are detected by the photo detectors $14_6$, $14_7$ and $14_8$ and fed into matrix 35. Then, in accordance with the answer button depressed and bits $12_6$, $12_7$, $12_8$, level signals LO to L6 are generated. Bits $12_1$ to $12_4$ are transmitted to computing matrix 37 which generates signals representing the address of the film frame to be branched and the branching direction, forward or reverse. The address of the film frame to be branched is stored in the register 24. The signal showing the branching direction drives the tape driving device 21 through the controller 26 and thereby the sound tape is operated in the status of quick feeding (preferably 10 to 20 times the normal speed of playback) and in a forward direction or reverse direction according to the signal on line 39 or 40. The signal of reverse direction quick feeding on line 40 is set so that the film 10 may be fed in the reverse direction when the driving device of the slide projector is operated. In such a quick feeding status, since the circuit is shut off by relay 67, the narration detected at the sound head 17 can not be heard from the speaker 20. In the quick feeding, the film feed signal detected at the detection head 18 operates the slide projector driving device 15 through the controller 26 and moves the film 10 one frame at a time in the forward or reverse direction. Every time one frame is fed, bits $12_1$ to $12_4$ of each frame are detected by the photo detectors $14_1$ to $14_4$ and sent to the comparator 25 in which they are compared with the address of the film frame to be branched stored in the register 24. When an agreement is not met, the sound tape 8 still continues the quick feeding status and one frame of film is fed by detecting the film feed signal on line 50.

When agreement of bits $12_1$ to $12_4$ of the film frame with the address stored in register 24 is obtained by the comparator 25, the comparator 25 sends an output pulse to the controller 26. Then, when the tape 8 runs in the forward direction, the controller 26 operates the tape driving device 21 and tape running is thereby changed over to normal playback status and, in addition, all circuits are reset. When the tape 8 runs in the reverse direction in the quick feeding status, tape running is reset to normal forward playback status after one more film feed signal is detected, and all circuitry is reset.

After reset, the frame to be branched is projected for the student and, as required, the corresponding narration may also be given to the student. The synchronization between sound and picture is thus achieved.

The film advance pulse on line 44 is a time delayed signal to take into consideration that there is a mechanical time delay between the time when the slide projector driving device 15 receives the signal on line 50 and the time when an actual feeding is completed. Thus, a pulse on line 44 means that the film 10 has been fed and functions as a timing pulse. When the main switch (not shown) is pressed, a projection lamp of the slide projector and light soources $13_1$ to $13_8$ for code reading are lighted, and electric power is supplied to all circuits. When start switch 29 is pressed to start narration, the first frame is presented to the student, and sound comes out from the speaker 20.

When detector 18 detects a film feed pulse, the film driving device 15 is operated through a pulse on line 50, and the film is advanced by one frame. In cases where bit $12_5$ does not exist on the frame fed, narration is continued. On the other hand, when bit $12_5$ exists thereon, flip-flop 64 is set, sount tape driving motor is stopped, answer lamp 28 is lit to urge an answer to the question frame projected and an input from answer button 27 is made possible. When the student depresses selectively one button among five answer buttons, the answer is coded by coder 32 and put into computing matrix 35. Once an answer button is pressed, re-entry of power from the answer button is made impossible by resetting flip-flop 64. In matrix 35, the level for the answer is calculated in accordance with the matrix table of FIG. 6 on the basis of the answer button pressed and the input of photo detectors $14_6$ to $14_8$ representing answer bits $12_6$ to $12_8$ of the frame, and an input is made to matrix 37. In matrix 37, the address and direction to be branched are calculated in accordance with the table of FIG. 7 from the answer level and the input of photo detectors $14_1$ to $14_4$ representing program bits $12_1$ to $12_4$ of the frame. The direction of branching is represented by + and − in FIG. 7, and line 39 carries the output in the forward direction and line 40 carries the one in the backward direction in FIG. 3. The address of the frame to be addressed is given in binary signal of 4-bits and stored in register 24. It will be understood by those skilled in the art that computing matrices 35 and 37 are of any well-known type and may also, for example, be a matrix of field effect transistors (FET's) in a large scale integrated circuit (LSI). However, no matter what the choice of implementing computing matrices 35 and 37, those skilled in the art will recognize that the parameters of the matrices are completely specified by the tables of FIGS. 6 and 7.

The case where $+R_5$ is calculated in matrix 37 means that the direction of branching is forward and to advance to the frame whose film address bits $12_1$ to $12_4$ is represented by 1010. Furthermore, the signal is applied to line 39 to set flip-flop 53, and the tape driving motor is changed over to fast speed status through a control signal on line 54, and speaker 20 is disconnected from aplifier 19. The tape 8 is advanced forwardly at high speed, and everytime when a film feed pulse is detected by detector 18, the film 10 is fed by one frame in synchronization. Everytime when the film 10 is fed by one frame, comparator 25 compares address bits $12_1$ to $12_4$ of the frame with the address of destination stored in register 24. When the address of the frame fed and that of register 24 agree with each other, comparator 25 generates a pulse on line 48. Then reset pulse on line 61 is generated immediately to reset the tape running to "normal speed forward" and to reconnect the speaker 20 to amplifier 19.

In cases where the backward direction is calculated in matrix 37, the signal on line 40 is applied to set flip-flops 53 and 55, and the tape driving device 21 is set to backward fast speed and at the same time the slide projector driving device 15 is set to backward. In cases where branching is in the backward direction, the tape driving device 15 is reset to the normal forward speed only after one more frame is fed after a pulse on line 48 is generated. At the same time, the slide projector driving device 15 is reset to "forward". In this manner, the snychronization of sound tape 8 and film 10 is maintained.

The features of this device are that the programmed branch mode can be applied without counting the feeding number of the film and without any coding on the sound tape except for film feeding pulses for synchronization. One of the important characteristics is that bits $12_1$ to $12_4$ among bits of eight frames provided on the film 10 are also used not only for program bits to calculate the branching address, but also for the addresses of the film thereby simplifying the construction of the device without increasing the overall number of bits. In addition, in this device, the addresses of the film frames are not unique to individual frames, but a limited number of addresses are repeatedly used.

For instance, in the case of the main question frame, address bits being used are $R_{12}$ ($12_1$ to $12_4$, 0011), $R_{13}$(1011), $R_{14}$(0111) and $R_{15}$(1111). $R_1$(1000), $R_2$(0100), $R_3$(1100) are for a sub-question, $R_1$, $R_2$, $R_3$, $R_4$ are for sub-frames, and $R_5$, $R_6$ are used in a sub-sub-frame. For a simple explanation frame, $R_7$, $R_8$ and $R_9$ are used. An actual example of a software program is shown in FIG. 8. When the explanation of theme I is completed and No. (3) frame is presented to the student, running of the sound tape is stopped and the answer of the student is awaited. When the student selects answer B out of the answer group of the three selection branch and button B is pressed, the signal of $+R_4$ (which means to advance to the frame whose address bits of $12_1$, $12_2$, $12_3$, $12_4$ is 0010 in the forward direction) is transmitted from matrix 37, frames of No. (4), (5), (6) and (7) are skipped, the narration is reopened at a normal speed at frame No. (8) and the correct answer is notified. When button A is pressed at No. 3 frame, signal $+R_1$ is transmitted and stoppage is made at frame No. (4) having address bits of 1000. When button E is pressed after the student's wrong answer is pointed out at frame No. 4 (in this case, buttons A, B, C, and D are not operated), signal $-R_{12}$ is transmitted from matrix 37. Signal $-R_{12}$ means to proceed to the frame whose address bits 12 to 12 are 0011 in the backward direction, but, since in the comparator 25 of FIG. 3 the logic is incorporated so that $-R_{12}$ may become equivalent to $-R_{13}$, $-R_{14}$ and $-R_{15}$, return is made to frame No. (3).

Next, the case where the question frame is presented together with narration will be explained.

This case differs from the first case in that, since the narration is introduced in the question frame, the circuit for maintaining synchronization between the sound tape and film frame differs slightly from FIG. 3. (The question frame is not necessary to be actually in the form of question, but means a frame to start branching. For instance, frames Nos. (4), (6) and (7) of FIG. 8 are not of questions, but are formally called Question Frames though after the student's completion of supplemental study course, advance is not made sequentially to the next frame, but branching is made to a frame in either the backward or forward direction.) Another difference is that, in this case, bit $12_5$ is not used for stopping instruction by the sound tape 8, but for representing whether each frame should be the one to be branched or not.

Figure 9:
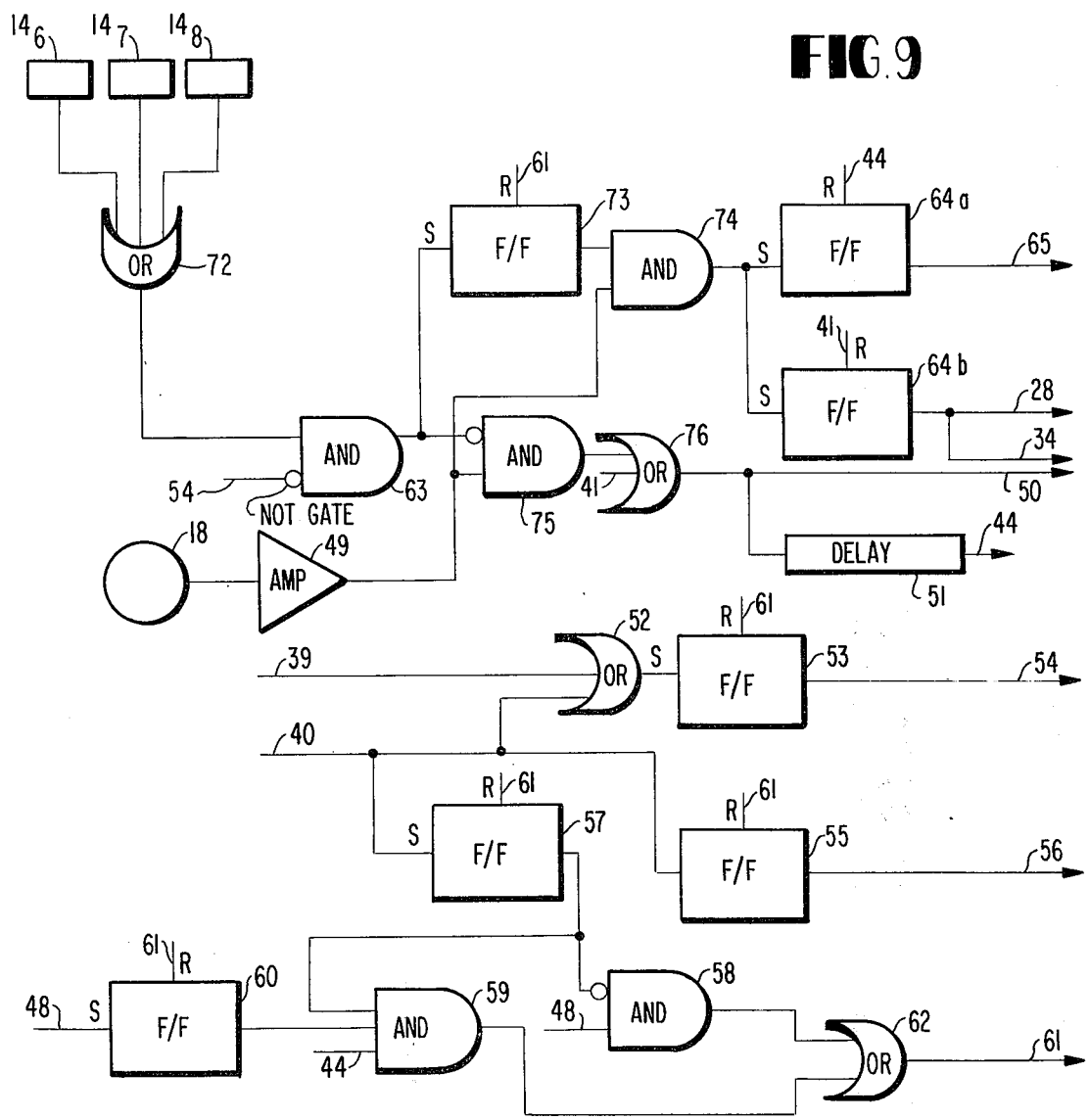
FIG. 9 is a logic circuit of an alternative embodiment of the controller shown in FIGS. 2 and 4 for the case where a question frame is presented together with narration.
Figure 10:
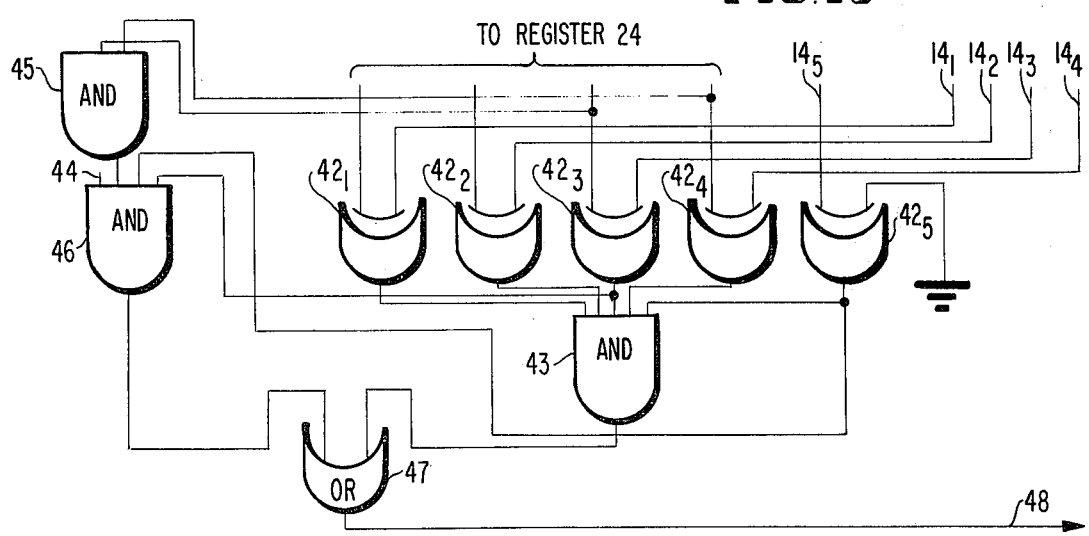
FIG. 10 is a logic circuit of the modified comparator used in the operator shown in FIG. 3 with alternative embodiment of the controller shown in FIG. 9.

The modifications to the logic of the controller 26 and the comparator 25 for the case where the question frame is presented together with narration are shown in FIGS. 9 and 10, respectively, wherein like reference numerals represent the same or corresponding elements of FIGS. 3 and 4, respectively. In FIG. 9, the outputs of photo detectors $14_6$, $14_7$ and $14_8$ are connected through OR gate 72 and AND gate 63 (if the tape driving device is not in a quick feed status) to set flip-flop 73 which enables AND gate 74 to pass a film advance pulse from amplifier 49. At the same time, the output from AND gate 63 inhibits AND gate 75 to block the film advance pulse to OR gate 76. OR gate 76 receives either the film advance pulse (when AND gate 75 is enabled) or the output of OR gate 36 in FIG. 3. In FIG. 10, one additional EXCLUSIVE OR gate $42_5$ has been added to the comparator 25. One input to EXCLUSIVE OR gate $42_5$ is grounded while the other is connected to photo detector $14_5$. It will be appreciated that there is no essential difference between comparator 25 shown in FIG. 3. The difference is that in FIG. 10 a redundancy bit is provided, i.e., $14_5$. When the FIG. 10 circuit is used as the comparator, only film frames which have the bit $12_5$ can be branched.

In the case where narration is added to the question frame, film feed signals are recorded on the second track between corresponding narrations to frames of the first track. In this case, in the question frame, it is necessary that the running of tape 8 is stopped when the corresponding narration is compledted. Therefore, the completion of narration is adapted to be detected by the film feed signal. In the case of an explanation frame, when the tape is being played back normally by the film feed signal, the film 10 is advanced by one frame. On the other hand, in the case of question frame, the logic circuit is incorporated in the controller so that when the film feed signal is fed to the controller 26, tape running may be stopped and the film may not be fed. When the question frame is projected and corresponding narration is completed, the film feed signal is detected by the detection head 18 and sent to the controller 26. The controller processes the signal to stop the running of the sound tape 8 without feeding one frame of film 10, and the indication lamp 28 urging the student to answer is turned on. In this case, since the film 10 is not fed by one frame by the film feed signal, the film 10 and sound tape 8 are out of synchronization. This non-synchronization status is used to condition a one-shot which is triggered when the student presses any answer button, and drives slide projector driving device 15 to advance the film 10 by one frame. The operation thereafter is exactly the same as that of the aforementioned case. By doing this, obtaining the synchronization between the film 10 and sound tape 8 becomes possible.

It will be understood that when audio narration is presented in the question frame, the film frame and the tape recorder have to stop only after the corresponding narration is over. If the projected frame is a question frame, at least one of the answer bits $12_6$ to $12_8$ will be detected and flip-flop 73 will be set. When a film feed pulse is applied to gate 74, flip-flops 64a and 64b will be set, and the tape recorder motor will stop thereby establishing a and the tape recorder motor will stop thereby establishing a stand-by condition awaiting an answer input by the student. In this condition, even if a film feed pulse is applied, the film frame is not advanced but, instead, the tape recorder stops so that the student can make his answer.

When the student pushes one of the answer buttons A to E during the stand-by condition, a pulse on line 41 will be applied to OR gate 76, and the film frame is moved forward by one frame to recover audio and visual synchronization. As a matter of course, when the projected film frame is not a question frame, the film frame will be moved forward by one frame if a film feed pulse is applied to gate 75.

Thus, it will be seen that in this case, the signal of OR gate 72 of each output of photo detectors $14_6$, $14_7$ or $14_8$ is used as the stop instruction of the sound tape. In other words, only the bits $12_1$ to $12_4$ word as program bits (bits for calculating branching addresses), and only when the $12_5$ bit is added to bits $12_1$ to $12_4$, they work as address bits of the frame. In this manner, this latter case has more freedom in producing the software program study material than the former case.

Thus, as described hereinabove, the training device in accordance with the present invention is able to project various questions and answers with an explanation in sound. Further, after the answer is selected by the student, the subsequent image to be projected is selected according to the answer selected to give the most pertinent explanation or comment to the student. Therefore, the question and answer system can be established with high efficiency from the viewpoint of education.

While the invention has been described in detail and with reference to specific embodiments thereof, it will be apparent to one skilled in the art that various changes and modifications can be made therein without departing from the spirit and scope thereof.

What is claimed is:

1. An audio-visual training device comprising:
   a. a visual-record having a plurality of image frames, some of said image frames having a first binary signal groups for instruction purposes and second binary signal groups representing the address of the image frame and others of said image frames having only said binary signal groups representing the address of the image frame, said first and second binary signal groups being in the vicinity of corresponding ones of said image frames,
   b. an audio-record in which audio information corresponding to each of said image frames of said visual record is recorded in the same sequence as that of said image frames of said visual-record on a first track and image frame feed signals are recorded on a second track at the end of each image frame of said visual record, c. film projector means for presenting each image frame of said visual-record to a student, said film projector means including driving means for feeding the image frames of said visual-record one-by-one, in accordance with a feed signal, and in a forward or reverse direction, in accordance with an image frame drive direction signal, and first and second detecting means provided in said film projector means for reading said first and second binary signal groups, respectively, in the vicinity of each said image frame of said visual record, d. audio-record player means including an audio circuit for presenting said audio information recorded on said first track of said audio-record to the student, and for reproducing said image frame feed signals recorded on said second track of said audio-record, said audio-record reproducing means further including driving means for running said audio-record in the forward direction at the play-back speed of said audio information, for stopping the running of said audio-record and for running said audio-record at a higher speed than said play-back speed in the forward or reverse directions in accordance with a play-back signal, a stop signal, a high speed forward drive signal and a high speed reverse drive signal, respectively, and e. controlling means connected to receive the outputs of said first and second detecting means in said film projector means and the reproduced image frame feed signals from said audio-record player means for generating said feed signal and image frame drive direction signal supplied to said film projector means and said play-back signal, said stop signal, said high speed forward drive signal, and said high speed reverse signal supplied to said audio-record player means, said controlling means comprising:

i. push button means having a plurality of push buttons for entering the reactions or selections of the student from answer choices provided in said image frame of said visual-record presented to the student by said projector means, ii. operator means connected to receive the outputs from said push button means, and said first and second binary signal groups from said first and second detector means respectively, and including first computing means for computing from said first binary signal group and the outputs of said push button means level signals corresponding to the level of the entry or selection made by the student and second computing means for computing from said second binary signal group and said level signals the address of the image frame of said visual-record to be accessed next and generating signals corresponding to the feed direction of said image frame to be accessed, iii. register means connected to said second computing means for storing the computed address of the image frame to be accessed next, iv. comparator means connected to receive the output signals from said second detector means and to receive the computed address stored in said register means for comparing the address stored in said register means and the output signals from said second detector means when said visual-record is fed by said film projector driving means, and generating an output pulse when the outputs of said second detector means agree with said address stored in said register means, v. first control means for causing the first image frame of said visual-record and the corresponding audio information of said audio-record to be presented to the student when power is turned on, vi. second control means connected to receive said reproduced image frame signals from said audio-record player means for generating said feed signal to said film projector means to advance said image frames one-by-one in response to the image frame feed signals reproduced from said sound track of said audio-record when no first binary signal group is provided in the vicinity of a presented image frame of said visual-record, vii. third control means operative when a first binary signal group is provided in the vicinity of a presented image frame of said visual-record for generating said stop signal to said audio-record player means so as to stop the generating of said feed signals to said film projector means by said second control means, viii. fourth control means responsive to the output of said push button means when it is operated by the student, to said feed direction signals from said second computing means, to said output of said comparator means and to said image frame feed signals for first generating from the outputs of said push button means a feed signal to said film projector means to advance said visual-record in a forward direction one image frame in order to regain synchronization between said audio-record and said visual-record and, if there is an output pulse from said comparator means, then generating a reset pulse to said register means and presenting the next image frame and corresponding audio information to the student, but if there is an output pulse from said comparator means when said visual-record is advanced in a forward direction one image to regain synchronization between said audio-record and said visual-record, then generating a feed signal, in response to the reproduced image frame feed signals, and an image frame drive direction signal to said film projector means and, until an output pulse is received from said comparator means, generating said high speed forward drive signal or said high speed reverse drive signal according to said image frame drive direction signal, ix. fifth control means responsive to an output pulse from said comparator means, to said feed direction signals from said second computing means and to said reproduced image frame feed signals for first generating a reset signal to said register means and generating a stop signal to said audio-record player means immediately if the drive is in the forward direction and after receiving an image frame feed signal if the drive is in the reverse direction, and then generating a play-back signal to said audio-record playing means, and x. sixth control means responsive to said fourth control means for inhibiting the presenting of said audio information recorded on said first track of said audio-record while either said high speed forward or reverse drive signals are connected.

* * * * *